(12) United States Patent
Astrom et al.

(10) Patent No.: US 6,169,881 B1
(45) Date of Patent: Jan. 2, 2001

(54) METHOD AND APPARATUS FOR PREDICTING IMPENDING SERVICE OUTAGES FOR GROUND-TO-SATELLITE TERMINAL IN A SATELLITE COMMUNICATION SYSTEM

(75) Inventors: Richard Lawrence Astrom, Gilbert; Brian Michael Daniel, Phoenix; Alvin William Sheffler, Mesa, all of AZ (US)

(73) Assignee: Motorola, Inc., Schaumburg, IL (US)

( * ) Notice: Under 35 U.S.C. 154(b), the term of this patent shall be extended for 0 days.

(21) Appl. No.: 09/072,042

(22) Filed: May 4, 1998

(51) Int. Cl.$^7$ .......................... H04B 7/185; H04B 17/00; H04Q 7/20
(52) U.S. Cl. ...................... 455/12.1; 455/430; 455/67.6
(58) Field of Search ............................... 455/12.1, 13.1, 455/504, 505, 506, 427, 430, 10, 423, 424, 425, 67.6, 67.1

(56) References Cited

U.S. PATENT DOCUMENTS

| | | | |
|---|---|---|---|
| 4,896,369 | * | 1/1990 | Adams, Jr. et al. .................... 455/10 |
| 5,422,813 | * | 6/1995 | Schuchman et al. ............. 455/443 X |
| 5,555,444 | * | 9/1996 | Diekelman et al. ................. 455/12.1 |
| 5,710,758 | * | 1/1998 | Soliman et al. ................. 455/67.6 X |
| 5,918,176 | * | 6/1999 | Arrington, Jr. et al. ............. 455/430 |
| 5,946,603 | * | 8/1999 | Ibanez-Meier ...................... 455/13.1 |
| 6,032,105 | * | 2/2000 | Lee et al. ............................. 455/67.1 |

OTHER PUBLICATIONS

Barts, et al., Modeling and Simulation of Mobile Satellite Propagation, Atennas and Propagation, IEEE Transaction on Atennas and Propagation, vol. 40, No. 4, Apr. 1992.*

An article entitled "Photogrammetric Mobile Satellite Service Prediction" by Riza Akturan and Wolfhard J. Vogel from NAPEX 94, Vancouver, BC Jun. 17, 1994.

An article entitle, "Path Diversity for LEO Satellite–PCS In The Urban Environment", by Riza Akturan and Wolfhard J. Vogel, from EERL–95–12A, Dec. 13, 1995.

An article entitle, "Image Analysis As A Tool For Satellite–Earth Propagation Studies", by Riza Akturan, Hsin–Piao Lin and Wolfhard J. Vogel, Proceedings of NAPEX XX, Jun. 4–6, 1996, Publication Sentel, 1996, pp. 243–255.

* cited by examiner

Primary Examiner—William G. Trost
Assistant Examiner—Tracy M Legree
(74) Attorney, Agent, or Firm—Jennifer B. Wuamett; Frank J. Bogacz

(57) ABSTRACT

A method (1300) and apparatus (300) combines a terminal blockage profile for a ground-to-satellite terminal with satellite location and motion data for one or more satellites (12) in a satellite communication system (10) to predict an impending service outage or impairment on a real-time or near real-time basis and reports such impending outages or impairments, and the expected duration thereof, to the terminal operator. The prediction of an impending outage or impairment also can include analysis of information concerning atmospheric conditions in the vicinity of the terminal location as well as other potential sources of a service outage or impairment.

14 Claims, 10 Drawing Sheets

METHOD AND APPARATUS FOR PREDICTING IMPENDING SERVICE OUTAGES FOR GROUND-TO-SATELLITE TERMINAL IN A SATELLITE COMMUNICATION SYSTEM

CROSS REFERENCE TO RELATED APPLICATION

This application is related to co-pending application Ser. No. 08/963,490 filed on Nov. 3, 1997 and assigned to the same assignee as the present application, which application is incorporated herein by reference. This application also is related to co-pending application Ser. No. 08/845,487, filed on Apr. 25, 1997 and assigned to the same assignee as the present application, which application also is incorporated herein by reference.

FIELD OF THE INVENTION

This invention relates generally to the field of wireless communications, and more particularly to predicting impending service outages for a ground-to-satellite terminal in a satellite communication system.

BACKGROUND OF THE INVENTION

The frequency allocations for wireless communication networks employing non-geosynchronous satellite communications normally reside in the UHF-, L-, S-, and K-Band frequencies or higher. Wireless communication systems utilizing K-Band frequencies require a clear line-of-sight between each node of the communication network for high-quality communications. Objects such as trees, utility poles, mountains, buildings, and overpasses that lie along the communications path will effectively fade or block the communication transmissions at K-Band frequencies and higher, therefore degrading, interrupting, or terminating the communication path.

Furthermore, for a ground-to-satellite radio communication link that utilizes low-earth orbiting satellites which move across the sky and rise and set at the horizon, the percentage of time that the communication link is available varies considerably depending upon the buildings, trees and other blocking items in the vicinity of the ground antenna. Likewise, occurrence of service outages for an operator of a particular terminal can vary over time as a result of changes in the vicinity of the ground antenna (e.g., due to maturation of trees and/or construction of new buildings, atmospheric conditions, and the like). Customers of these systems, however, are typically not informed as to when their communication link may be blocked due to such obstacles or as a result of atmospheric conditions, such as rain for example.

Therefore, what is needed is a system and a method which provides an advanced warning on a real-time or near real-time basis of impending periods of service outages or degradation of service quality resulting from obstacles or impairment of communication links to allow customers to prepare for and plan around such impending outages. What is also needed is a method and apparatus to allow service providers to have a record of actual service outages to verify customer outage claims and to aid in trouble-shooting and providing maintenance service for customer terminals.

BRIEF DESCRIPTION OF THE DRAWINGS

A more complete understanding of the invention can be derived by referring to the detailed description and claims when considered in connection with the figures, wherein like reference numbers refer to similar items throughout the figures, and wherein:

DETAILED DESCRIPTION OF A PREFERRED EMBODIMENT

Figure 1:
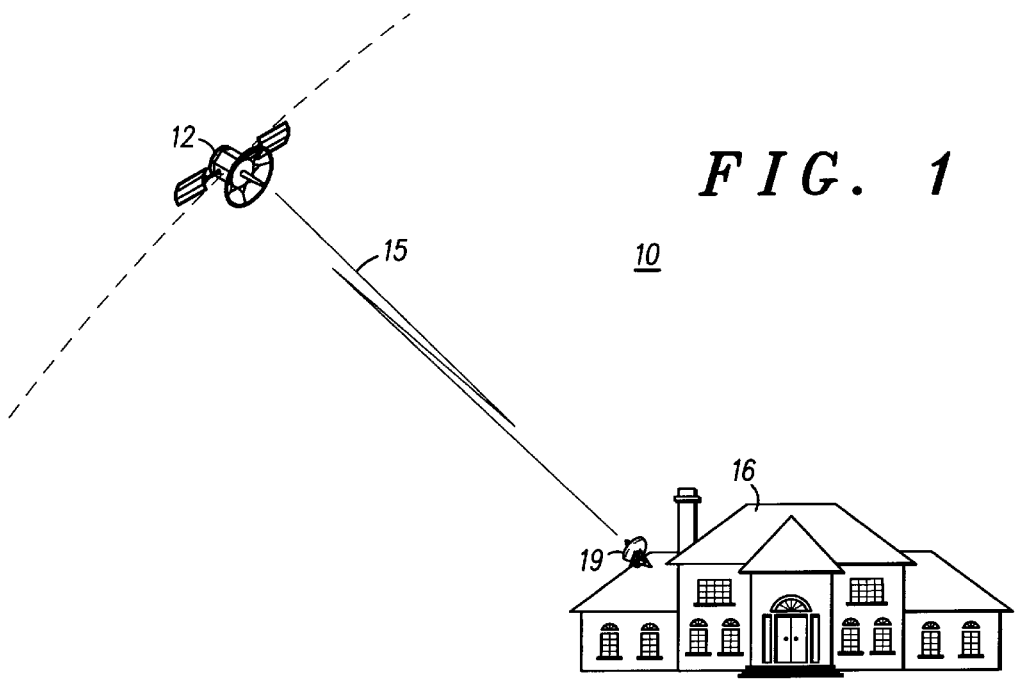
FIG. 1 illustrates a communication system for providing terminal to satellite communication links in accordance with a preferred embodiment of the present invention.

The present invention provides, among other things, a method and apparatus which combines a sky blockage map for an individual ground-to-satellite terminal in a satellite communication system with information concerning the direction and location of system satellites above a minimum elevation angle to predict impending service outages or impairments for an individual ground-to-satellite terminal in a satellite communication system and to notify the terminal operator of such impending outages or impairments, and the expected duration of the same. The present invention can be used to predict and notify a terminal operator of impending outages or impairments of virtually any type, including, for example outages or impairments resulting from buildings, trees, weather or atmospheric conditions, and even spectrum sharing or interference mitigation issues. In a preferred embodiment of the present invention, impending service outages are predicted on a real-time or near real-time basis, and the terminal operator is informed as to when the communication link will be reacquired and service will resume.

By employing the method and apparatus of the present invention to predict service outages or impairments and report impending outages or impairments to the terminal operator, the operator will be warned of impending outages or impairments. Providing such warnings to users minimizes user frustration in the event of an outage and allows a terminal operator to have a more realistic expectation of the quality of service capable of being delivered to the operator. Moreover, providing such warnings also allows the operator to take appropriate precautions to minimize effects of interruption of service, such as unexpected interruption of transmission or receipt of data or information.

The present invention also provides a method and apparatus which allows service providers to access records of service outages or impairments experienced by their customers or subscribers to verify customer outage claims and to aid in trouble-shooting and providing maintenance service for customer terminals.

Wireless communication systems which operate at relatively high operating frequencies such as K-Band frequencies or higher, require unobstructed lines-of-sight between the nodes of the communication system to maintain high-quality communication pathways or links. If one or more obstructions partially or completely block a line-of-sight between the nodes, degradation, interruption, and/or termination of a communication pathway or link can result.

Non-geosynchronous satellite-based communication systems normally incorporate broadband services utilizing relatively high frequency allocations in communication links between one or more non-geosynchronous satellites and terminals based below, near, or above the surface of the earth. Non-geosynchronous satellites continuously move about the earth in predetermined orbital traverses. Therefore, in non-geosynchronous satellite-based communication systems, the quality of the communication pathways or links necessarily depends on the ability of the communication system to maintain the communication links in the presence of potential blocking, fading, interference and other factors that can severely affect communication pathways or links. Thus, unobstructed direct lines-of-sight between terminals and satellites are necessary to maintain the communication pathways at an adequate level of service.

With regard to earth-based or ground-based terminals, the motion of non-geosynchronous satellites with respect to the ground ultimately presents problems when one or more of the satellites reside at sufficiently low elevation angles relative to the terminals because of the line-of-sight blockage that ultimately occurs as a result of trees, buildings, mountains, and the like between the terminals and the satellites. Thus, to maintain the communication pathways or links, it is necessary to switch or hand-off the communication link or links from the obstructed satellite to another satellite in clear line-of-sight of the terminal. Although current algorithms are designed to switch or hand-off from a satellite which is about to drop below a minimum elevation angle to a new one which is higher than the minimum elevation angle with respect to the terminal, the present invention has the capability to respond to the localized environmental obstructions around the terminal in order to maintain one or more communication links and to inhibit fading and blocking of one or more communication links. The present invention also has the capability of predicting when communication links may, nonetheless, temporarily be inhibited as a result of an environmental obstruction and of informing the terminal operator of an impending temporary service outage or impairment.

It is contemplated that communication terminals include those that could be either continuously or intermittently mobile or positioned in a permanent location such as on the roof of a user's building/house. Terminals could be individual ground-based customer premise units or a primary communication system control facility. It is also contemplated that terminals could be located anywhere below, near, or above the surface of the earth when suitable and practical.

In this regard, the field-of-view of a selected terminal at any location normally suffers from varying elevations of obstructions that can degrade, interrupt, and/or terminate communication links between the terminal and one or more of the non-geosynchronous satellites located at low elevation angles. The present invention increases the efficiency and economy of non-geosynchronous satellite-based communication systems utilizing relatively high-band frequencies and minimizes degradation, interruption, and termination of one or more of the communication links as a result of local environmental obstructions that can compromise the line-of-sight between terminals and satellites. The present invention is not only advantageous in combination with K-Bands and other higher frequency bands, but also any frequency band that is prone to fade and blockage as a result of obstructions or interference.

Referring to FIG. 1, communication system 10 for facilitating one or more terminal-satellite communication links is shown. Reference communication elements of communication system 10 are represented by satellite 12 and terminal 16 (located within or near the represented structure). Satellite 12, also referred to as a node, transmits and maintains communication pathway or link 15 with a terminal 16 having an antenna 19 or other mechanism suitable for maintaining a communication link with one or more satellites 12. With reference to FIG. 1, satellite 12 is non-geosynchronous in relation to antenna 19. In alternate embodiments of the present invention, system nodes could be devices other than satellites 12. For example, a node could be a ground-based or aircraft-mounted transceiver. In addition, some of the advantages of the present invention could be realized where the node is stationary.

Consistent with the foregoing discussion, terminal 16 and/or antenna 19 could be positioned below, near, or above the surface of the earth. In addition, terminal 16 and/or antenna 19 could be mobile, movable from one location to another, or positioned in a permanent location. However, to facilitate ease of discussion, terminal 16 is a terrestrial ground-based terminal located at a selected position upon the surface of the earth. Communication system 10 desirably operates at relatively high operating frequencies such as K-Band frequencies or higher. As a result, unobstructed lines-of-sight are desirable or required between one or more satellites 12 and antenna 19 to maintain one or more communication pathways or links 15.

Figure 2:
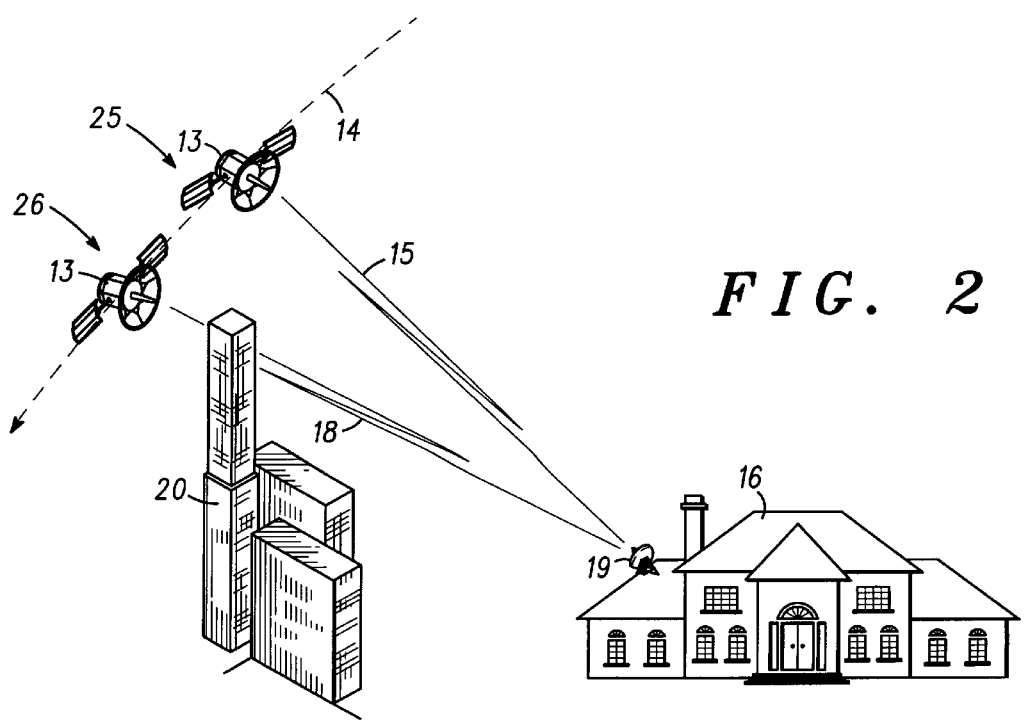
FIG. 2 illustrates a time stepped position of a satellite of the communication system of FIG. 1, a terminal, and a structure blocking a communications path between the satellite and the terminal in accordance with a preferred embodiment of the present invention.

To illustrate the anomaly and environment of fading and blocking, attention is directed to FIG. 2. In FIG. 2, illustrated is a time stepped position of a satellite 13 of communication system 10. Also shown is terminal 16 and communication link 18 maintained by and between satellite 13 and antenna 19 of terminal 16. A structure 20 is further shown positioned intermediate antenna 19 and satellite 13 when satellite 13 is in position 26. Arrowed line 14 indicates a flight path of satellite 13 along a predetermined orbital traverse. Satellite 13 is shown as it might appear at two different positions, position 25 and position 26, at two different instances along its flight path. Position 25 of satellite 13 is somewhat more elevated relative to antenna 19 than position 26. In position 25, the line-of-sight and communication link 15 between satellite 13 and antenna 19 are completely unobstructed. However, in position 26, the line-of-sight and communication link 18 between satellite 13 and antenna 19 are obstructed by structure 20 which could result in either the degradation, interruption, or termination of communication link 18.

Consistent with the foregoing discussion, and like other ground-based terminals, antenna 19 could be present in rural, suburban, or urban areas. At any of these locations, antenna 19 could have a user sky field-of-view having varying degrees of localized signal obstructions such as trees, shrubs, utility poles, small and large buildings, bridges and the like above which the user sky is unobstructed and below which the user sky is partially or totally obstructed. At any location at which antenna 19 resides, the localized signal obstructions define a localized fade and blockage environment.

Regarding fading and blocking, each are greatly dependent upon the nature of the environmental obstructions. For instance, communication pathways normally experience shadowing when the line-of-sight between the satellite and the terminal is obstructed by trees and shrubs whereby K-Band signals are typically completely blocked by trees, or the like. In this regard, the degree of shadowing, or partial blockage, is greatly dependent upon the frequency of the carrier and the amount of foliage present upon the trees and bushes and other similar plant growth. Although shadowing does not necessarily block a communication pathway, its presence greatly diminishes the quality of the communication pathway and can lead to the eventual termination of the communication pathway. On the other hand, communication pathways normally experience complete blockage when the line-of-sight between the satellite and the terminal is obstructed by mountains and structures such as buildings or overpasses. In these cases, the line-of-sight becomes completely obstructed, often resulting in the termination of the communication pathway.

To accommodate local environmental obstructions and to increase the economy, efficiency, and reliability of communication system resources, the method and apparatus of the present invention operate to ascertain the blockage environment or the nature of local environmental obstructions present within the field-of-view of the terminal in order to establish where the user sky is clear, where it is shadowed by trees or shrubbery, and where it is blocked as a result of mountains and structures such as buildings or overpasses to accurately and reliably predict impending outages or impairments of a communication pathway or link between an individual ground-to-satellite terminal and one or more satellites of a satellite communication system. A user blockage map is then created and merged with a satellite sky path profile to create a satellite blockage profile. This profile is then used to construct an outage time line profile for the ground-to-satellite terminal and to predict and communicate or report impending service outages or impairments to the terminal operator, as discussed in further detail below.

Figure 3:
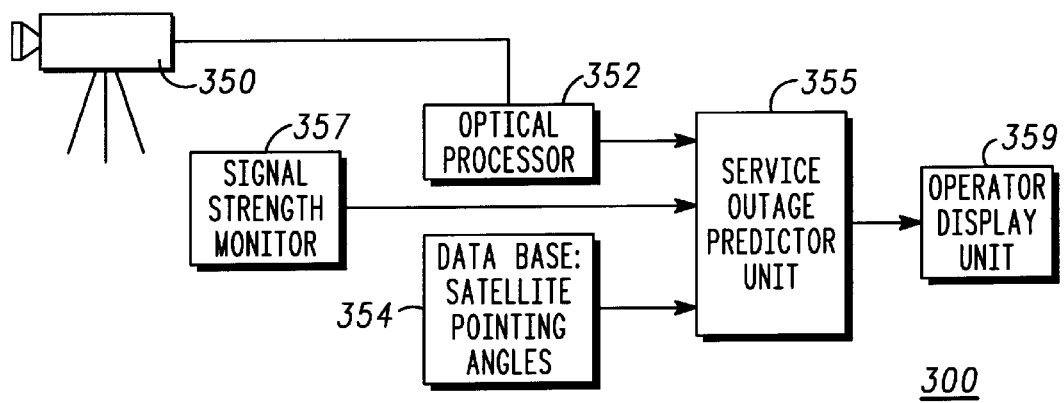
FIG. 3 illustrates a block diagram of an apparatus for predicting impending service outages or impairments in an individual ground-to-satellite terminal and reporting such impending outages or impairments to a terminal operator in accordance with a preferred embodiment of the present invention.

FIG. 3 illustrates a block diagram of an apparatus 300 for predicting service outages or blockage in an individual ground-to-satellite terminal and reporting such outages or impairments to a terminal operator in accordance with a preferred embodiment of the present invention. In a preferred embodiment of the present invention, apparatus 300 predicts and reports impending service outages or impairments to a terminal operator on a real-time or near real-time basis.

Apparatus 300 includes fisheye lens camera 350 having a hemispherical fisheye lens that is typically on a telescoping pole long enough to reach the peak of a roof to where the antenna of the terminal is to be placed. The camera may be stabilized horizontally and north may be identified on the resulting image.

Figure 4:
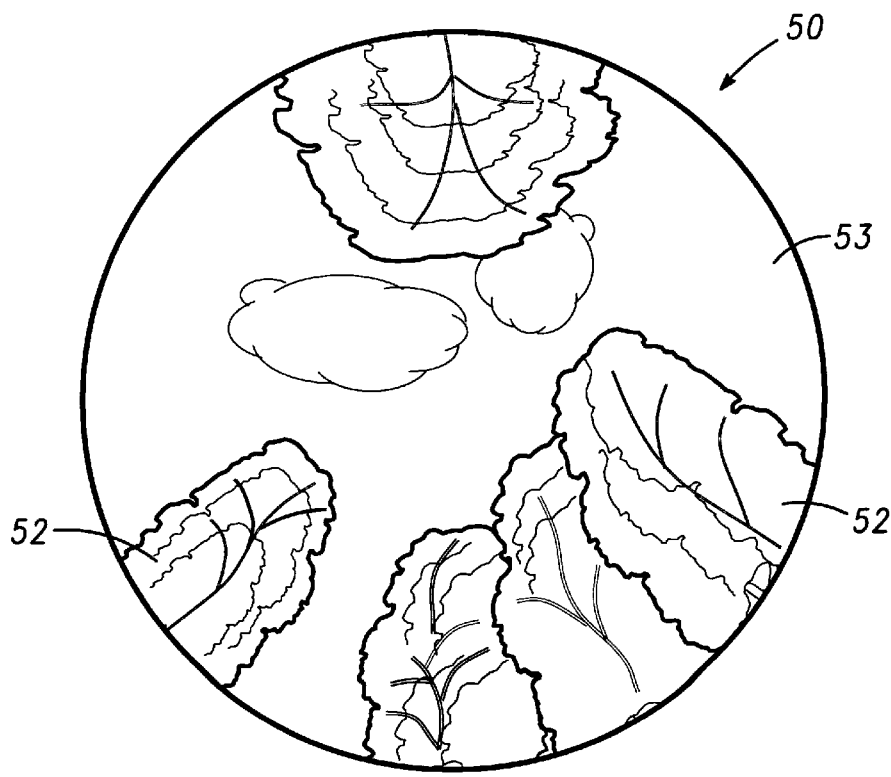
FIG. 4 illustrates a representation of a field-of-view of a terminal illustrating potential signal obstructions in accordance with a preferred embodiment of the present invention.

FIG. 4 illustrates a terminal field-of-view 50 taken by a fisheye lens camera, such as fisheye lens camera 350 (FIG. 3), at the site of a ground-to-satellite terminal antenna, such as antenna 19 (FIG. 2) and illustrates potential signal environment obstructions. Field-of-view 50 illustrates obstructions 52 present at low elevation angles which may lead to fading and blocking. Although obstructions 52 are herein shown as trees and shrubs and the like, obstructions 52 could also include mountains, buildings or other obstructions. Alternatively, obstructions 52 could represent atmospheric conditions such as, for example, rain cells or the like which impair the communication pathway or link between antenna 19 and one or more satellites. Obstructions 52 bound a clear and unobstructed users sky 53. Field-of-view 50 essentially defines the blockage profile at the antenna of the terminal at the site, e.g., at antenna 19 (FIG. 2) of terminal 16, for example.

Figure 9:
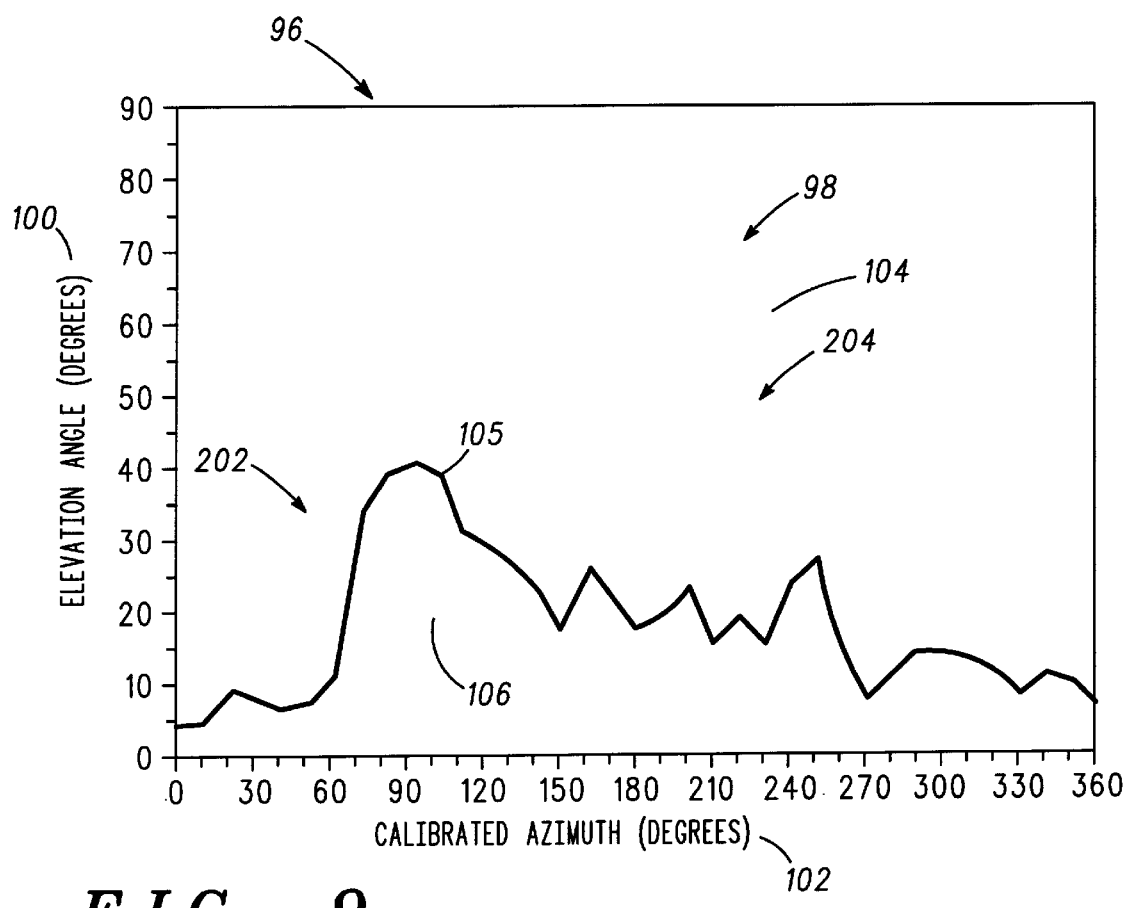
FIG. 9 illustrates an optical terminal blockage profile of a field-of-view of a terminal derived in accordance with a preferred embodiment of the present invention.

Referring back to FIG. 3, the output of camera 350 desirably is a fisheye image, similar to the one shown in FIG. 4, that is input to optical processor 352 for creating a blockage map of the sky at the user terminal site. An example of such a blockage map created by processor 352 is illustrated in FIG. 9 and will be described in detail hereinafter. The blockage map of the sky typically includes digital values representing block/shadowed/clear for each pixel of the image. It is understood that camera 350 and optical processor 352 may take the form of a laser range finder which does not take an image, but directly generates sky blockage data typically in rectangular form.

Apparatus 300 also includes data base 354 which includes the pointing angles, both azimuth and elevation, to all visible system satellites as a function of time, for a time period calculated to be a large enough sample to represent all times. Data base 354 can be created using methods known to those of ordinary skill in the art.

Service outage predictor unit 355 combines the sky blockage map from processor 352, with the satellite pointing angles from database 354, to determine impending outages or impairments for the location of the terminal where the photo was taken. The output of service outage predictor unit 355 desirably is a report sent to operator display unit 359 displaying status of system satellites with respect to the terminal on a periodic or continual basis and/or reporting impending blockages or impairments of the communication link from antenna 19 (at which the fisheye lens camera photo was taken) to one or more satellites of the satellite communication system on a real-time or near real-time basis. In a preferred embodiment, service outage predictor unit 355 implements processing steps described in detail with respect to FIG. 13 below.

Apparatus 300 also desirably (but not necessarily) includes signal strength monitor 357 which is adapted to predict impending system impairments resulting from atmospheric conditions. In a preferred embodiment, signal strength monitor 357 is adapted to continuously monitor broadcast channels from satellites in view of antenna 19 (FIG. 2). This allows the ground-to-satellite terminal to switch to a different satellite when a blockage occurs or when a satellite goes over the horizon. The signal strength of a broadcast channel along with the satellite ephemeris data and the terminal blockage map can be used to define an atmospheric disturbance such as rain cells or very dense cloud formations.

The signal strength of a broadcast channel from an unobstructed view of a second or third satellite is predictable. Generally, if the signal strength varies from a predetermined profile it is indicative of an atmospheric condition. Monitoring the signal strength of the broadcast channels results in a short term atmospheric map or rain map. The size of the rain/cloud cell can then be mapped and used to predict the length of an impending outage or impairment associated with the atmospheric condition.

Figure 5:
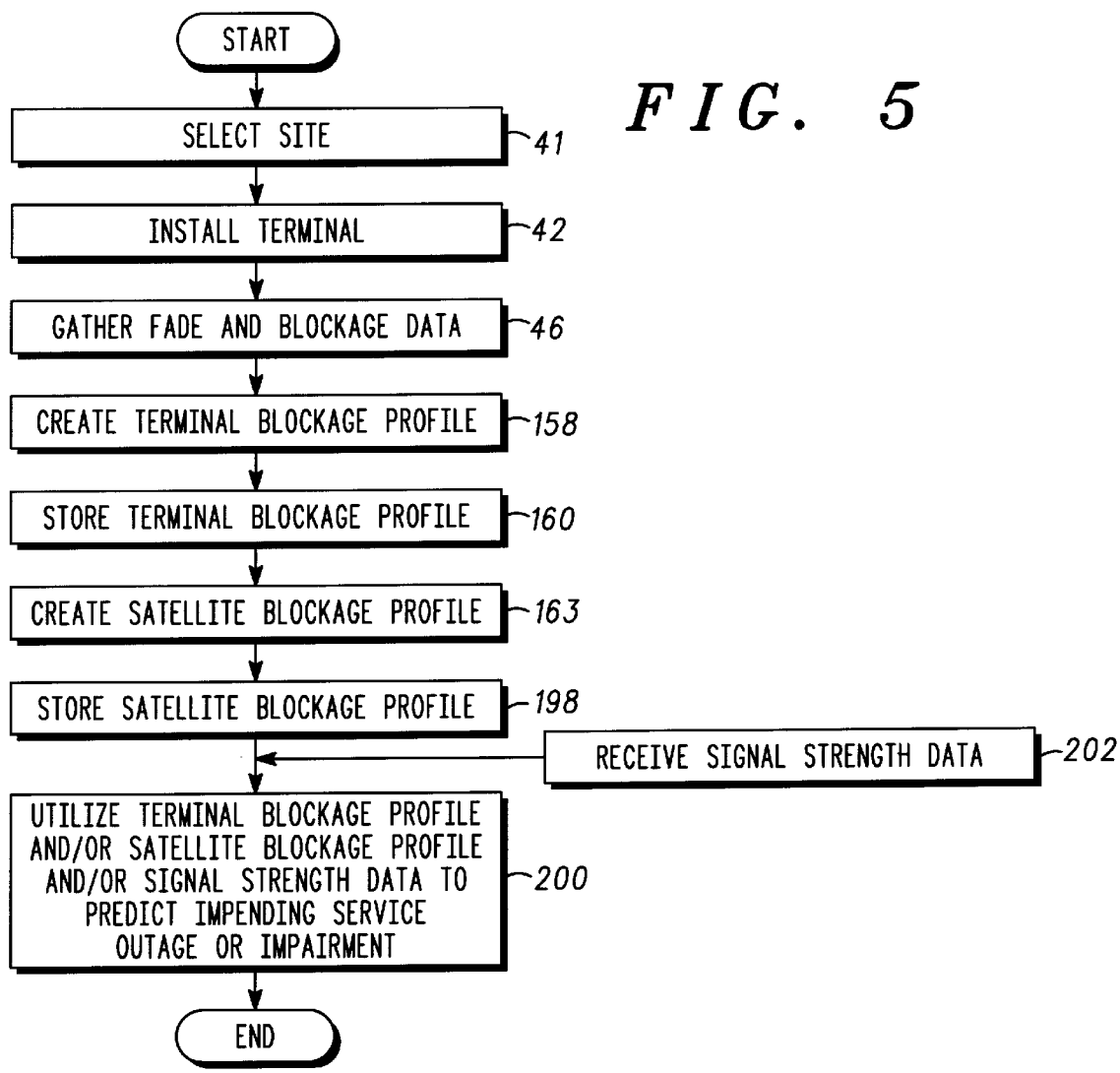
FIG. 5 illustrates a flow chart of a method of establishing and responding to a blockage environment in a communication system in accordance with a preferred embodiment of the present invention.

Referring now to FIG. 5, there is illustrated a flow chart of a method of establishing and responding to a blockage environment in a communication system to accurately and reliably predict an individual ground-to-satellite terminal's percentage of successful communication linkage time to one or more satellites of a satellite communication system.

The method begins, in the first instance, by selecting a site in task 41 at which antenna 19 will reside and then installing antenna 19 in task 42 at a either a rural, suburban, or urban area. After the site has been selected and antenna 19 installed, a task 46 is performed to gather fade and blockage data present within the field-of-view 50 (FIG. 4) of the terminal antenna 19. This task may be performed by camera 350 (of FIG. 3), for example. For clarity, fade and blockage data is essentially comprised of the physical environment of the terminal antenna field-of-view 50 and of obstructions 52 shadowing or blocking user sky 53. In one embodiment, fade and blockage data could be simply depicted as a binary condition, where, for a particular point in the terminal field-of-view, a zero could represent a clear condition and a one could represent a blocked condition, for example. In other embodiments, fade and blockage data could indicate a relative degree of blocking. For example, a scale of one to ten could be used to indicate how shadowed a signal is at a particular point. For example, a zero could indicate that no shadowing exists along the line of sight. A three could indicate that a mild obstruction (e.g., a tree) exists along the line of sight. A ten could indicate a complete blockage condition. This binary or relative degree depiction of a blockage environment could be applied to both a terminal blockage profile and a satellite blockage profile, both of which will be described in detail below.

As will be described in conjunction with FIGS. 6–11, task 46 could be performed in a variety of ways suitable for allowing a user to easily and efficiently establish a terminal blockage profile. Four exemplary ways of gathering fade and blockage data are: (1) using field-of-view (e.g., optical) data (FIG. 8) such as via fisheye lens camera 350; (2) using the signature of the signals due to blocking (FIG. 6) (e.g., Fresnel diffracted signal measurements); (3) using backscatter signal data (FIG. 10); and (4) using a directional laser range finder. Preferred embodiments of three of these ways of gathering fade and blockage data will now be described, although other ways of gathering fade and blockage data also could be used.

Figure 8:
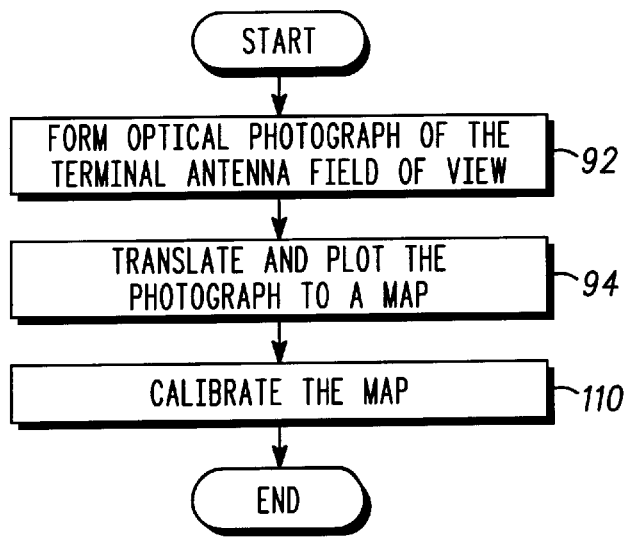
FIG. 8 illustrates a flow chart of a method of creating an optical terminal blockage profile in accordance with a preferred embodiment of the present invention.

Referring back to FIG. 5, task 46 may be performed by creating a terminal blockage profile of a field-of-view of the terminal antenna. In a preferred embodiment, a terminal blockage profile of a field-of-view of the terminal antenna is derived from optical data. However, in alternate embodiments, the field-of-view of the terminal antenna could be derived from data measurements anywhere along the spectrum (e.g., optical, infrared, ultraviolet). FIG. 8 is a flow chart of a method of creating an optical terminal blockage profile in accordance with a preferred embodiment of the present invention. In this regard, the optical terminal blockage profile corresponding to field-of-view 50 is initiated in task 92 by first forming an optical image or representation of field-of-view 50 of the terminal antenna with a fisheye lens camera (such as camera 350 of FIG. 3) having a full 180 degrees field-of-view.

The reduction of a fisheye optical image of a selected field-of-view is described in Akturan & Vogel, *Photogrammetric Mobile Satellite Service Prediction*, NAPEX 94 (Jun. 17, 1994). The optical image, of which would be generally representative to field-of-view 50 shown in FIG. 4, is then translated and mapped or plotted via an algorithm or other means in task 94 in the form of a sky blockage map 96 as evidenced in FIG. 9.

FIG. 9 illustrates an exemplary optical terminal blockage profile of a field-of-view of a terminal derived in accordance with a preferred embodiment of the present invention. Sky blockage map 96 corresponds to a two dimensional blockage profile 98 of an optical representation of field-of-view 50 of antenna 19 plotted in the form of elevation angle 100 as a function of azimuth angle 102 with area 104 above curve 105 corresponding to unobstructed user sky 53 in which communication may take place, and area 106 below curve 105 corresponding to a blockage region defined by obstructions 52 present within field-of-view 50 in which communication may not take place. Map 96 represents a typical output of optical processor 352 of FIG. 3.

Referring back to FIG. 8, once plotted, calibration of sky blockage map 96 takes place in task 110. In a preferred embodiment, calibration of map 96 involves determining the direction of zero degrees in azimuth via a compass or other suitable mechanism to establish a coordinate system for antenna 19. Completion of tasks 92–110 result in the creation of an optical terminal blockage profile.

Figure 6:
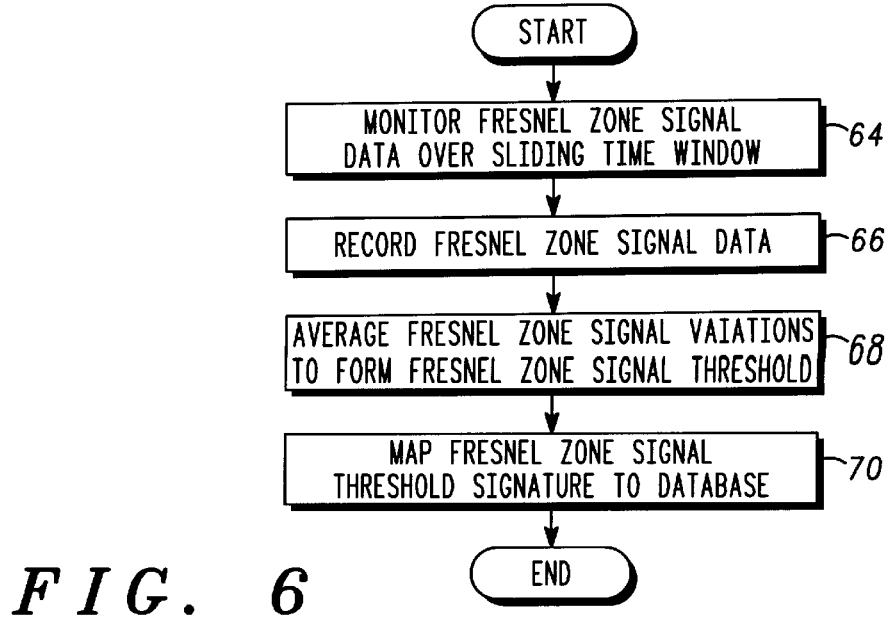
FIG. 6 illustrates a flow chart of a method of creating a terminal blockage profile based on Fresnel diffracted signals in accordance with a preferred embodiment of the present invention.

Additionally, referring back to FIG. 5, task 46 could be performed by creating a terminal blockage profile based on Fresnel diffracted signals. FIG. 6 is a flow chart of a method of creating a terminal blockage profile based on Fresnel diffracted signals in accordance with a preferred embodiment of the present invention. In alternate embodiments, other methods can be used which indicate blockages from signal measurements.

In a terminal-satellite communication system utilizing broadband channels, when the line of sight between the satellite and the terminal is unobstructed, the signal strength of the communication link is nearly constant. However, as the satellite moves in the user sky in relation to the terminal and the line-of-sight is about to be shadowed or blocked by an approaching obstruction, the Fresnel diffracted signal strength fluctuates as evidenced by rapid variations in the diffracted signal's amplitude. The variance in the amplitude of the Fresnel diffracted signal indicates that shadowing or blockage is about to occur as a result of an approaching obstruction.

Large objects such as mountains, buildings, and similar structures result in large variations in the Fresnel diffracted signal amplitude. In any event, the signature of the Fresnel diffracted signal will exhibit certain strength characteristics evidenced by variances in the Fresnel diffracted signal amplitude depending upon whether the line-of-sight between the satellite and the terminal is unobstructed, about to experience partial or total obstruction, shadowed, partially obstructed, or totally obstructed.

Referring to FIG. 6 and pursuant to the foregoing, Fresnel diffracted signal data from one or more communication pathways or links is monitored over a sliding time window in task 64. The Fresnel diffracted signal data could be monitored either at antenna 19 or at one or more of the satellites 12 of the constellation of satellites. The Fresnel diffracted signal data is recorded in task 66 either at antenna 19 or at one or more of the satellites 12. The variations in the signal strength or amplitude of the Fresnel diffracted signal is then averaged or normalized in task 68 to create a Fresnel diffracted signal threshold or signature. In a preferred embodiment, the Fresnel threshold corresponds to an average signature of Fresnel diffracted signals for an average communication pathway within the field-of-view 50 of antenna 19. In alternate embodiments, the Fresnel threshold could be set at a different level. The Fresnel threshold is then mapped or plotted to a database in task 70 in the form of a map. Completion of tasks 64–70 results in the creation of a terminal blockage profile based on Fresnel diffracted signals.

Figure 7:
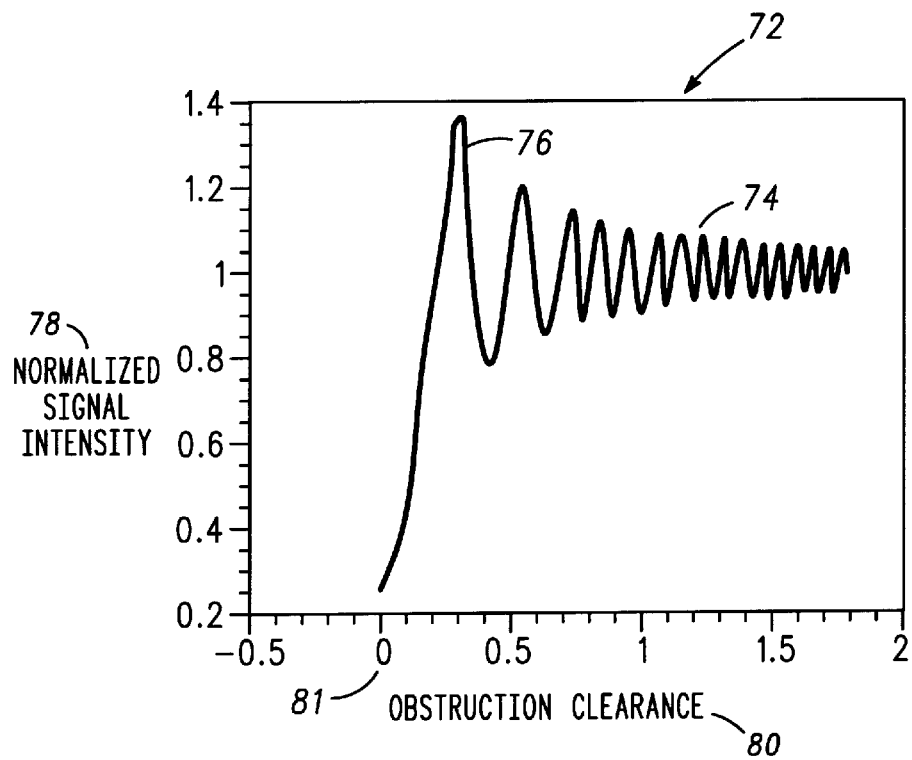
FIG. 7 illustrates a graphical diagram based on Fresnel diffracted signals for a field-of-view of a terminal derived in accordance with a preferred embodiment of the present invention.

FIG. 7 illustrates a pictorial diagram based on Fresnel diffracted signals which shows a Fresnel threshold for a field-of-view of a terminal derived in accordance with a preferred embodiment of the present invention. Graph 72 corresponds to a two dimensional profile 74 of a Fresnel signature 76 (e.g., of field-of-view 50 of antenna 19) plotted in the form of normalized signal intensity or strength 78 as a function of obstruction clearance 80. FIG. 7 illustrates the amplitude variations of a Fresnel diffracted signal where the obstruction is relatively straight. The edge of such an obstruction would be located where the obstruction clearance 80 equals zero at point 81. The variance in the amplitude of the Fresnel signature 76 corresponds to the blockage environment at the terminal antenna.

Figure 10:
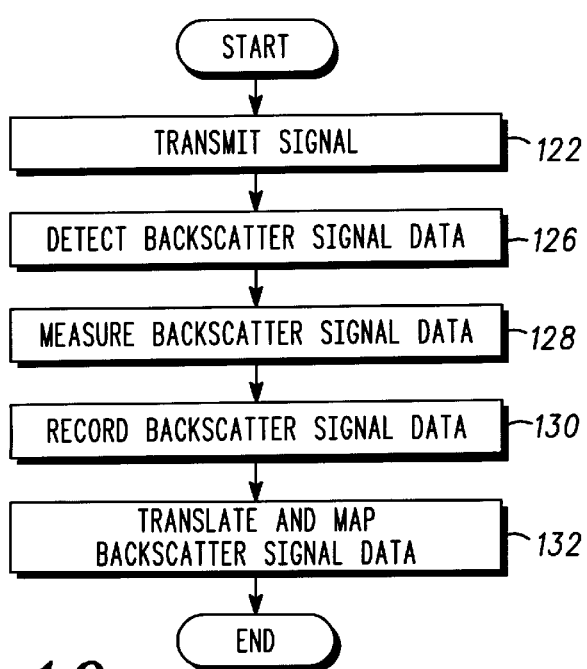
FIG. 10 illustrates a flow chart of a method of creating a backscatter terminal blockage profile in accordance with a preferred embodiment of the present invention.

Referring back to FIG. 5, task 46 could further be performed by creating a backscatter terminal blockage profile by virtue of a backscatter technique. FIG. 10 is a flow chart of a method of creating a backscatter terminal blockage profile in accordance with a preferred embodiment of the present invention. In this regard, the backscatter terminal blockage profile (e.g., corresponding to field-of-view 50) is carried out in task 122 by first transmitting a signal from antenna 19 in each direction (azimuth and elevation) of interest. The signal could be produced from a transmitter housed at the site of antenna 19 and could be emitted via antenna 19 or a similar mechanism in the form of a radio frequency signal, an infrared signal, or perhaps an ultrasound signal.

Regarding a preferred embodiment, the emitted signal is preferably a high-frequency (e.g., Ka-band or above) signal, or an infrared laser, that will reflect off of the environmental obstructions within field-of-view 50 of the terminal antenna. After transmission of the signal from antenna 19, the signal will impact obstructions 52 and reflect back to terminal 16 in the form of backscatter signal data. The backscatter signal data is then detected by terminal 16 in task 126 and measured in task 128 much like conventional radar measurements. The measurements are then recorded in task 130 either at terminal 16 or one or more of the satellites 12. In this manner, antenna 19 could be equipped with detection capabilities for detecting the backscatter signal data. The recorded backscatter signal data, which would be generally representative of field-of-view 50 shown in FIG. 4, is then translated and mapped or plotted via an algorithm or other means in task 132 in the form of a map 140 as evidenced in FIG. 11.

Figure 11:
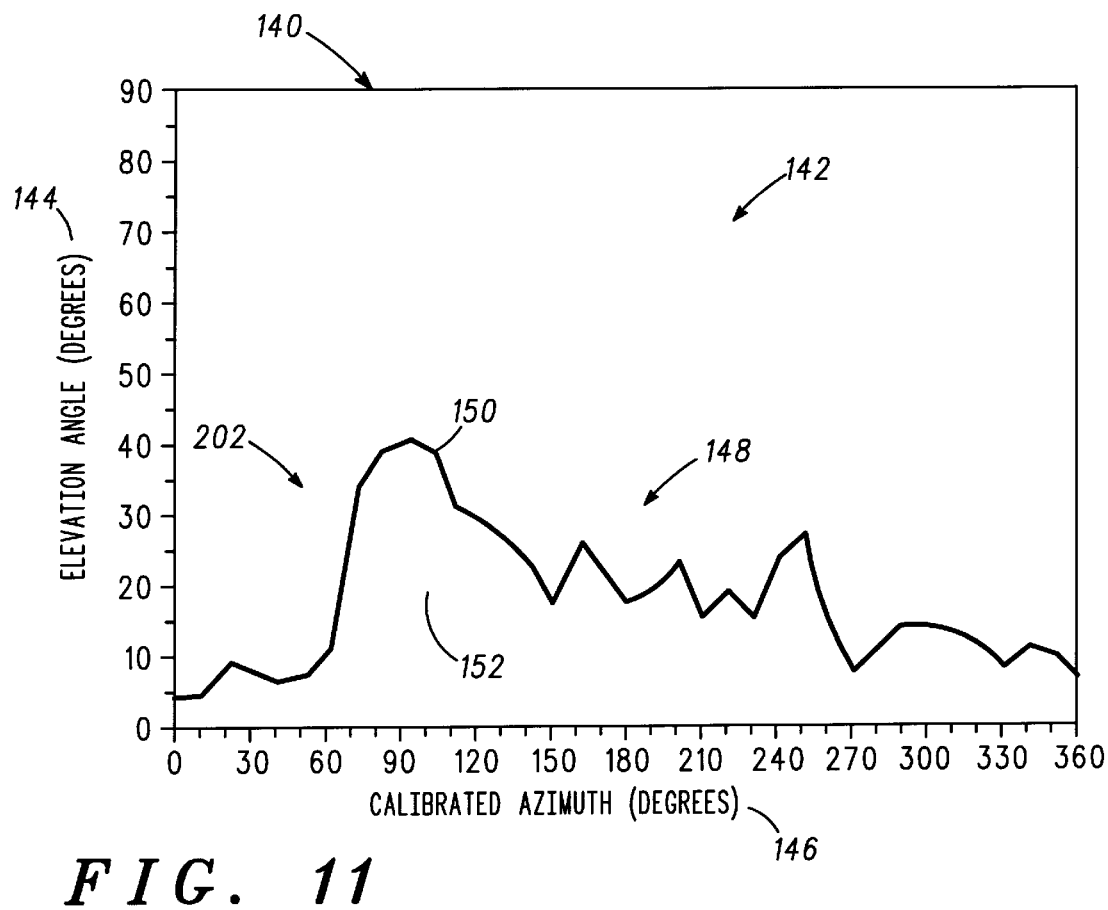
FIG. 11 illustrates a backscatter terminal blockage profile of a field-of-view of a terminal derived in accordance with a preferred embodiment of the present invention.

FIG. 11 is an exemplary backscatter terminal blockage profile of a field-of-view of a terminal derived in accordance with a preferred embodiment of the present invention. Having similar characteristics to map 96 (FIG. 9) previously discussed, map 140 corresponds to a two dimensional blockage profile 142 of a backscatter representation of field-of-view 50 of antenna 19 plotted in the form of elevation angle 144 as a function of azimuth angle 146. Area 148 above curve 150 corresponds to unobstructed user sky 53 in which communication may take place and area 152 below curve 150 corresponds to a blockage region defined by obstructions 52 present within field-of-view 50.

Referring back to FIG. 5, after and/or concurrent with gathering fade and blockage data in task 46, a task 158 is performed which uses the fade and blockage data to create a terminal blockage profile (e.g., maps 72, 96, 140) of the field-of-view of the terminal antenna to establish where the user sky about antenna 19 is clear, shadowed, or blocked.

After the terminal blockage profile of the field-of-view 50 of the terminal antenna has been formed (e.g., by virtue of field-of-view measurements, Fresnel diffracted signal measurements, or backscatter measurements), the terminal blockage profile is then stored in task 160 for eventual use by service outage predictor unit 355 (FIG. 3). The terminal blockage profile could be stored either at terminal 16, a separate control facility, or one or more of the satellites 12 of the constellation.

It may be periodically necessary to update the terminal blockage profile because the local environmental obstructions at the site at which antenna 19 resides could change. Additionally, the terminal blockage profile could require continuous or frequent updating if the terminal is continuously or intermittently mobile. Updating the terminal blockage profile would necessarily involve selectively and periodically or aperiodically repeating, in relevant part, the foregoing method steps relating to the creation of the terminal blockage profile.

Figure 12:
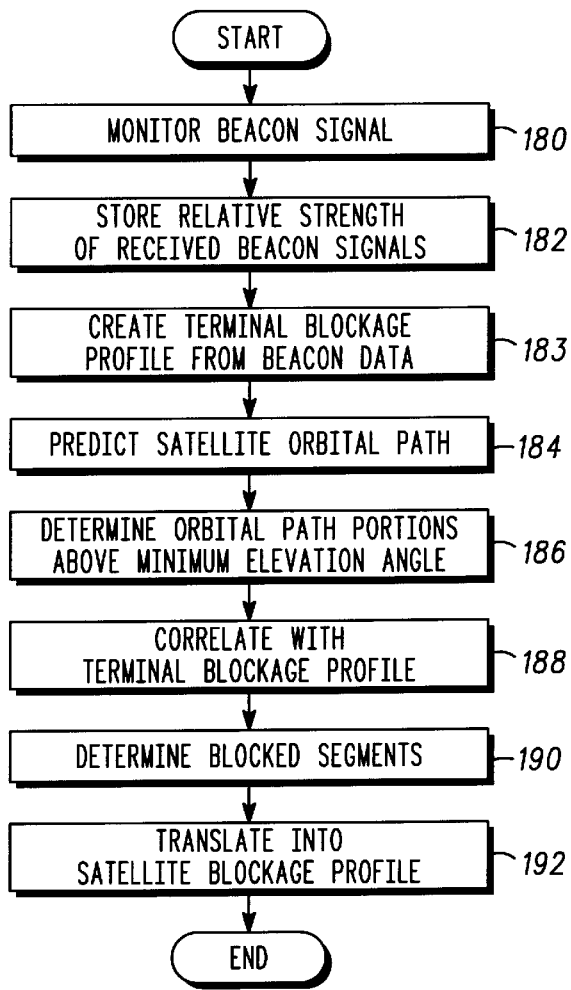
FIG. 12 illustrates a flow chart of a method of creating a satellite blockage profile in accordance with a preferred embodiment of the present invention.

In furtherance of a preferred embodiment of the present invention, it is advantageous to determine satellite blockage profiles for use in predicting and reporting impending service outages or impairments to a terminal operator in accordance with a preferred embodiment of the present invention. A satellite blockage profile maps blockage conditions between a terminal and a satellite from the satellite's perspective, whereas a terminal blockage profile maps the blockage environment from the terminal's perspective. Formation of a satellite blockage profile can be performed in several ways and takes place in task 163. FIG. 12 describes formation of a satellite blockage profile in accordance with a preferred embodiment of the present invention.

FIG. 12 illustrates a flow chart of a method of creating a satellite blockage profile in accordance with a preferred embodiment of the present invention. The method described in conjunction with FIG. 12 does not need to use terminal blockage profile data derived in accordance with steps 46–160 of FIG. 5. Rather, antenna 19 desirably is equipped with a beacon (e.g., an infrared transmitter) that emits a beacon signal which can be received by a satellite 12. During the course of a satellite pass (e.g., when satellite 12 is above a minimum elevation angle with respect to antenna 19), satellite 12 monitors this beacon signal in step 180 to determine the beacon's relative received strength. Where the received beacon signal is weak or non-existent, a partial or total obstruction between the satellite and terminal is likely. In another alternate embodiment, satellite 12 could be equipped with a beacon (rather than or in addition to terminal 16) and the beacon signals emitted by the satellite could be measured at the ground to determine obstructions.

The relative strengths of the received beacon signal measurements for a particular terminal are stored in task 182 to a database located either at terminal 16, a control facility, or one or more of the satellites 12 of the constellation. Data from numerous passes over a terminal can be combined to form a terminal blockage profile in step 183. This profile can be later processed to compute a map from a satellite's perspective that depicts the trajectory of the terminal as well as the time evolution of its blocking environment.

When blockage information is desired for an upcoming satellite pass with respect to a particular terminal, the satellite orbital path is predicted, in step 184, by either a satellite, a control facility, or a terminal. In step 186, at least those portions of the satellite orbital path for which the satellite will be located within the field-of-view of the terminal antenna is determined. In step 188, those portions of the orbital path are analyzed in the context with the data from the terminal blockage profile derived from beacon signal measurements.

Based on this analysis, segments of those portions during which a satellite-to-terminal communication link would be blocked, shadowed, or clear are determined in step 190. Desirably, this results in a set of times and/or satellite locations during which high-quality communications are possible between the satellite and terminal. In step 192, information describing the blocked, shadowed, and clear conditions are translated into a satellite blockage profile for that pass. Thus, performance of steps 180–192 result in the creation of a satellite blockage profile.

In a preferred embodiment, steps 180–182 are repeated each time a system satellite achieves a minimum angle of elevation with respect to the terminal, although selectively fewer repetitions could be performed. Repeated performance of steps 180–182 results in the creation of a cumulative database of blockage information. Steps 184–192 are performed each time a blockage profile for a particular satellite pass is desired.

As stated previously, to create a satellite blockage profile in accordance with FIG. 12, terminal blockage profile data derived from measurements made by the terminal is not necessary. Therefore, steps 46–160 of FIG. 5 need not necessarily be performed in order to achieve the advantages of the present invention.

Referring back to FIG. 5, the satellite blockage profile is stored in step 198 for eventual use by service outage predictor unit 355 (FIG. 3). Desirably, the satellite blockage profile is stored at terminal 16, although the profile could be stored in one or more satellites 12 or a control facility.

FIG. 5 additionally includes step 202 for receiving signal strength data. Signal strength data desirably is received in the form of a data from a computer database which is specific for the general area of the customer location of antenna 19 and represents a prediction of system availability for non-blocked sky based upon the weather model and the frequency, broadcast and antenna characteristics of the system. The output of step 202 is a prediction of service impairment or outage due to atmospheric conditions. Signal strength data could be input on a real-time or near real-time basis, or could be input based on estimates of weather conditions for some predetermined period of time from a weather model database. For example, the generation of a weather model database is described in at least two articles from the Proceedings of the Twenty-First NASA Propagation Experimenters Meeting (NAPEX XXI) and the Advanced Communications Technology Satellite (ACTS) Propagation Studies Miniworkshop held in El Segundo, Calif. in Jun. 11–13, 1997: (1) a NAPEX XXI article entitled "A New Rain-Rate Distribution Model: Preliminary Version for Annual Statistics", by R. K. Crane at the School of Meteorology at the University of Okla., published on Aug. 1, 1997, and (2) a NAPEX XXI article entitled "Fade Dynamics and its Evolution: The Other Part of the ACTS Rain Prediction Model", by Robert M. Manning of NASA's Space Communication Office, published on Aug. 1, 1997, the subject matter of which is incorporated by reference herein.

By virtue of an algorithm or other mechanism present at (1) terminal 16, (2) one or more of the satellites 12 of the constellation, or (3) a control facility, a response to the terminal blockage profile and/or the satellite blockage profile and/or the signal strength data could be analyzed for potential effects on the service availability in task 200 to predict impending service outages or impairments due to environmental obstacles and/or atmospheric conditions.

Figure 13:
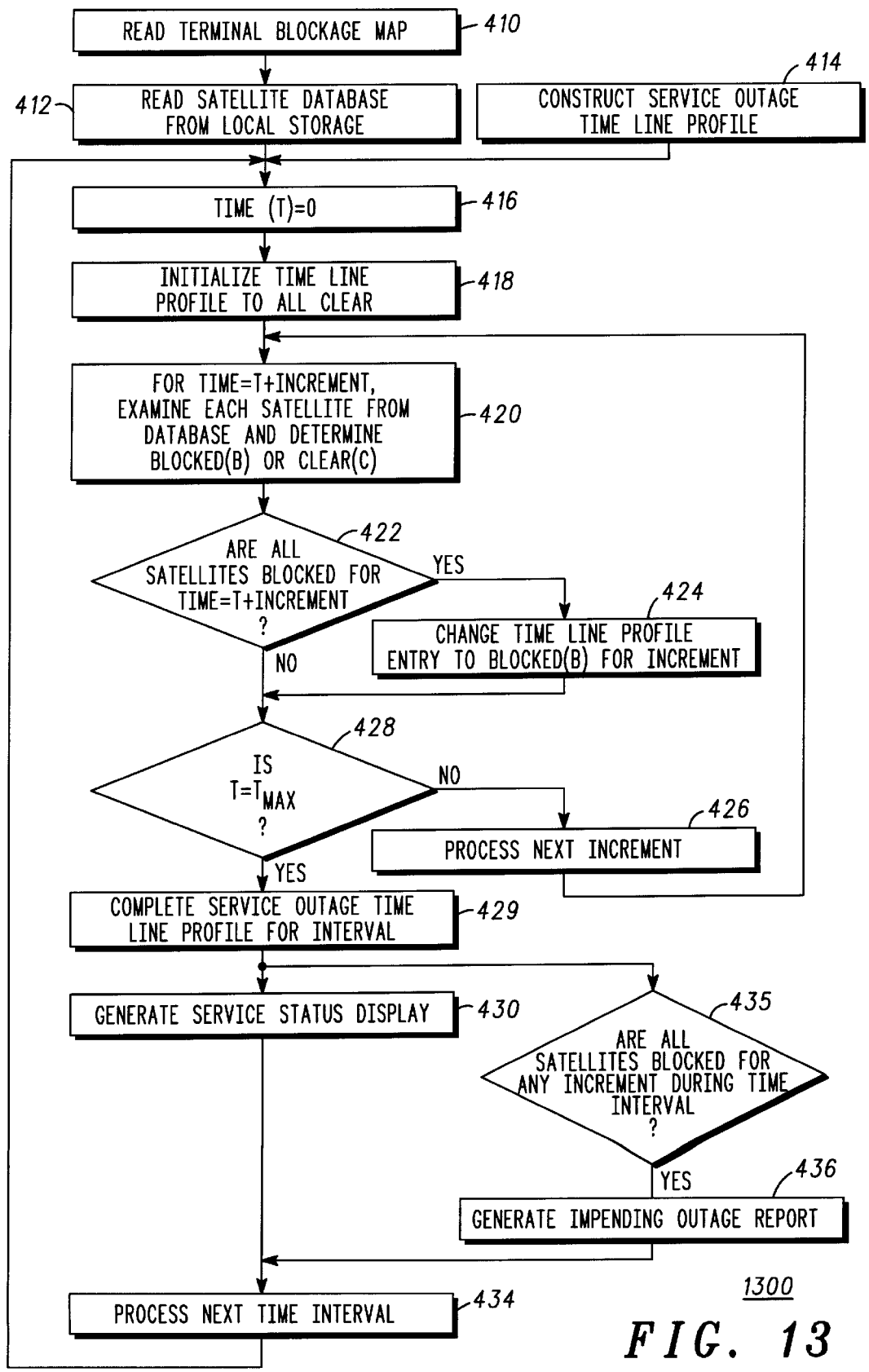
FIG. 13 illustrates a flow chart of a method for predicting impending service outages or impairments in an individual ground-to-satellite terminal and reporting such outages or impairments to a terminal operator in accordance with a preferred embodiment of the present invention.
Figure 18:
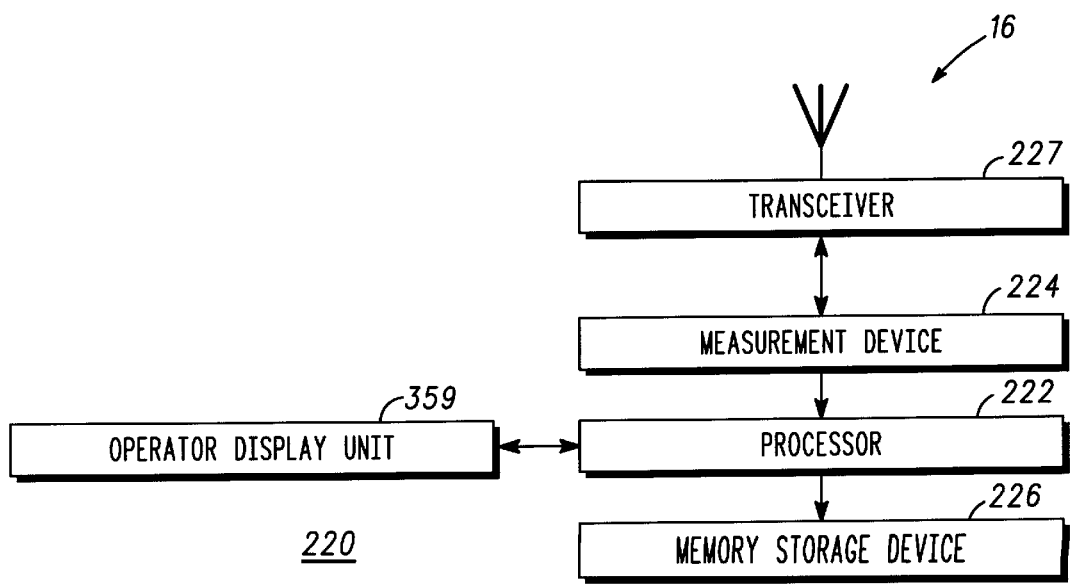
FIG. 18 illustrates a simplified block diagram of a user terminal in accordance with a preferred embodiment of the present invention.

FIG. 13 illustrates a flow chart of a method 1300 for predicting impending service outages or impairments in an individual ground-to-satellite terminal and reporting such outages or impairments to a terminal operator in accordance with a preferred embodiment of the present invention. The steps shown in FIG. 13 desirably are implemented within service outage predictor unit 355 of FIG. 3. Some or all of the steps of method 1300 also can be executed in a processor included in terminal 16 (FIGS. 1 & 18).

First, in step 410, a sky blockage map such as the one shown in FIG. 8 is analyzed by a processor, desirably in service outage predictor unit 355 (FIG. 3). This map may be input, for example, from optical processor 352 (FIG. 3). In step 412, the database containing satellite angles is analyzed, for example, from a local storage device such as database 354 (FIG. 3).

Figure 14:
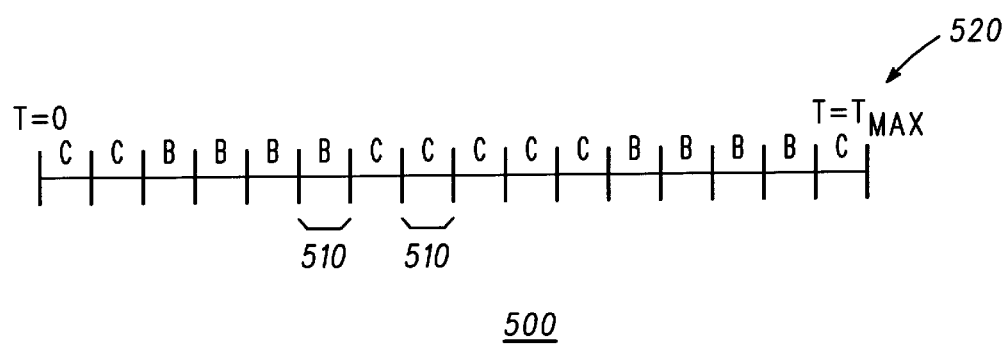
FIG. 14 illustrates a service outage time line profile in accordance with a preferred embodiment of the present invention.

In step 414, a service outage time line profile is constructed either concurrently or separately from steps 410 and 412. An example of a service outage time line profile is illustrated in FIG. 14. Service outage time line profile 500 includes multiple time increments 510 for a predetermined time interval 520 where $T=T_{max}$, where $T_{max}$ represents sum of time increments from $T=0$ to $T=N$. Although $T_{max}$ could be virtually any period of time represented in seconds, minutes, hours, days, or the like without departing from the spirit of the present invention, in a preferred embodiment of the present invention, $T_{max}$ is set at 1 hour. $T_{max}$ is incremented by the sampling period, and in a preferred embodiment, the incremental period is 5 seconds. However, the aforementioned incremental period is not intended to be limiting in the present invention, as a plurality of time periods may be used along with a plurality of time increments with the basic intent to obtain a plurality of samples that sufficiently represent the location of satellites with respect to the location of the terminal.

Time line profile 500 illustrated in FIG. 14 represents a completed time line profile as it could appear after completing steps 420–429 of method 1300. At step 414, time line profile 500 could appear as shown, where each time increment 510 has a designation, such as "C" (clear) or "B" (blocked) for the particular time increment, or time line profile 500 could be devoid of any designation for time increments 510.

Referring back to FIG. 13, in step 416, Time (T) is set to zero. In step 418, at T=0, outage time line profile 500 is initialized such that each time increment 510 (FIG. 14) is set to a default designation of "C" (clear) indicating that no impending service outage is expected for that time increment.

In step 420, a loop process is initiated whereby for T=0 and for each time increment Time=T+ increment, each satellite of the satellite constellation is examined from the database and it is determined whether each satellite is blocked or clear based upon the sky blockage map. In step 422 a determination is made as to whether all satellites are blocked for a particular time increment 510 (FIG. 14). If all satellites are blocked for the time increment currently being examined, then in step 424 the time line profile entry for that time increment will be changed from the default entry of "C" (clear) to an entry of "B" (blocked). If, however, in step 422 a determination is made that all satellites are not blocked for the particular time increment, no adjustment will be made to the default entry on the time line profile for that increment. In step 428 a determination is then made as to whether the predetermined time interval set on the time line profile has expired, or in other words, whether T=$T_{max}$. If a determination is made that the time interval has not expired, then the next time increment will be processed in accordance with step 426 and steps 420–426 will be repeated continually for the remaining time increments in the predetermined time interval 520. If it is determined in step 428 that the time interval has expired, then the method proceeds to step 429 where the outage time line profile is completed.

FIG. 14 illustrates a completed service outage time line profile in accordance with a preferred embodiment of the present invention. As a result of the analyses performed in steps 420–429, each time increment 510 in service outage time line profile 500 (FIG. 14) desirably is designated as "B" (blocked) or "C" (clear). In a preferred embodiment, if one or more satellites are in an unobstructed line of site of the terminal, then for that increment of time, the satellite terminal is considered to have a clear view of the system. In an alternate embodiment, time increments could receive designations other than or in addition to "C" (clear) and "B" (blocked). For example, time increments 510 also could be designated as "impaired" where fading, signal attenuation, or partial blockage will occur as a result of atmospheric conditions or partial environmental obstructions. Alternatively, such impaired increments could simply be designated as blocked.

Additionally, other system rules may be implemented herein such as the highest satellite must be in clear view in order to invoke a clear designation for a particular time increment. Alternately, the rules may require that two or more satellites must be in clear view in order to invoke a system clear designation for a particular time increment.

Yet alternatively, the rules may be adapted to designate an increment as being blocked if during that increment using one or more otherwise unobstructed communication links to one or more satellites of the constellation would cause interference with a satellite of another satellite communication system as a result of a spectrum sharing arrangement or the like. "Outages" arising from interference mitigation could simply be identified during a time increment as a "blockage" or they could be identified in some other manner so as to enable notification to the terminal operator that the impending service outage is the result of a spectrum sharing arrangement rather than a result of system error or environmental or atmospheric condition. In any event, the result of steps 414–428 is, in step 429, to create a completed outage time line profile, such as outage time line profile 500 shown in FIG. 14, which indicates whether the system will be available (clear) or not available (blocked) during the particular time interval.

Figure 15:
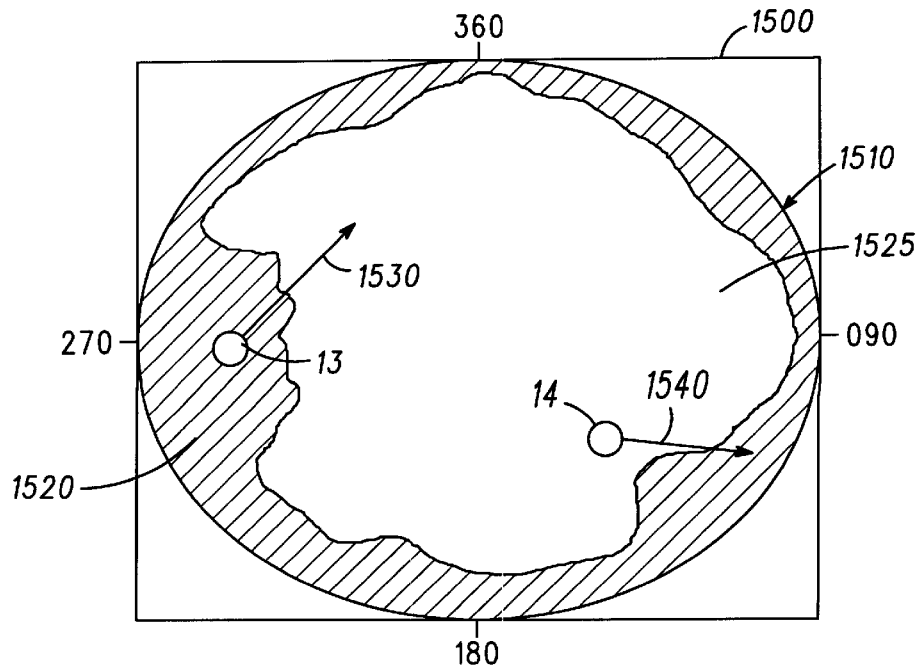
FIG. 15 illustrates a service status tracking display for use in a terminal operator display for predicting the initiation and duration of a service outage in accordance with a preferred embodiment of the present invention.

In step 430, a service status display is generated. FIG. 15 illustrates an example of a service status display for use in predicting the initiation and duration of a service outage in accordance with a preferred embodiment of the present invention. Service status display 1500 is a computer software generated operator interface display which desirably is generated by service outage predictor unit 355 (FIG. 3) and made to appear on operator display unit 359 (FIG. 3). Service status display 1500 desirably is generated by combining a terminal blockage map for the individual ground-to-satellite terminal (step 410 of method 1300, FIG. 13) with data concerning the current locations and directions of all system satellites above the minimum elevation angle (step 412 of method 1300, FIG. 13). The result, in a preferred embodiment of the present invention, is a circular operator display 1510 showing each satellite 13, 14 within a 360 degree field-of-view of the ground-to-satellite terminal within a predetermined time interval. The direction of travel of satellites 13 and 14 is represented, respectively, by arrows 1530 and 1540. Circular operator display 1510 also shows obstructed region(s) 1520 where communications links with satellite could be blocked or otherwise impaired and clear or unobstructed region/s 1525 where communication links to satellite are not expected to be blocked or impaired.

For example, at the time increment represented by service status display 1500, there are two satellites in view: satellite 13, which is in the west region (270 degrees) of the field-of-view; and satellite 14, which is in the southeast region (between 090 and 180 degrees) of the field-of-view of the antenna. Although satellite 13 is located within obstructed region 1520, satellite 14, is located within clear region 1525. Thus, the system is currently unobstructed or "clear."

Desirably, service status display 1500 is generated and updated on a continual basis and is available for viewing by the terminal operator continually. However, in alternate embodiments, service status display 1500 could be generated on a less frequent basis and appear only at specified times or could be adapted to appear only when a service outage or impairment is expected to occur within some predetermined amount of time or only when the terminal operator requests status information.

Figure 16:
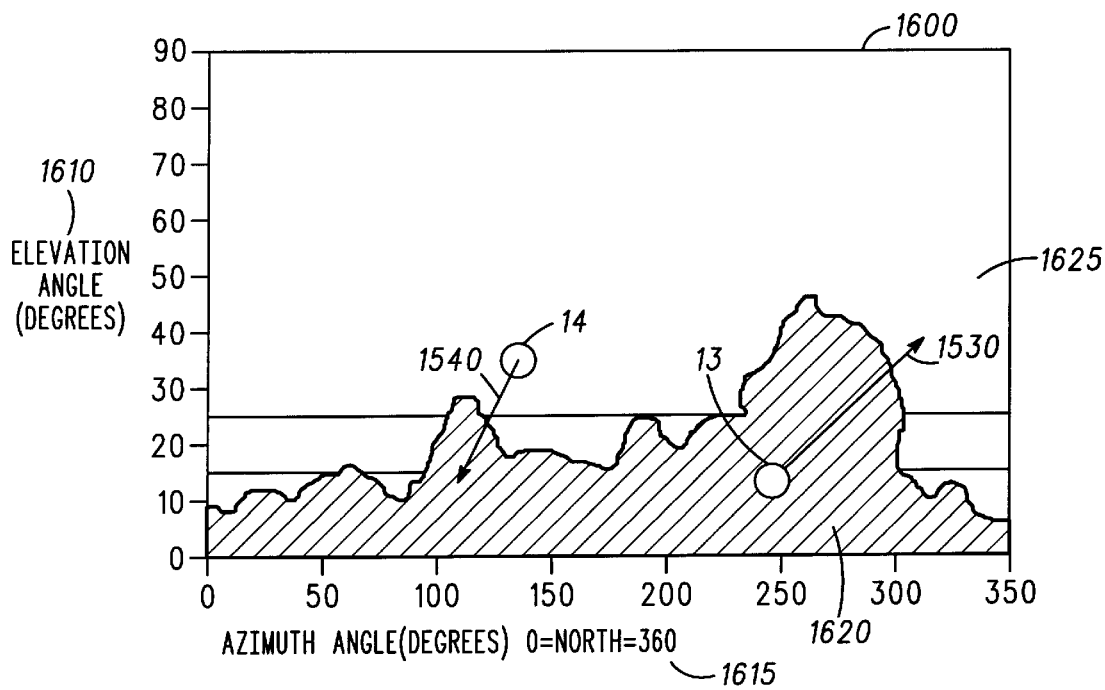
FIG. 16 illustrates a service status tracking display for use in a terminal operator display for predicting the initiation and duration of a service outage in accordance with an alternate embodiment of the present invention.

Moreover, circular operator display 1510, is intended to be an exemplary illustration of a service status display and is not intended to be limiting of the scope of the present invention. Service status display 1500 could take on other forms without departing from the spirit of the present invention. For example, FIG. 16 illustrates a service status display for use in a terminal operator display for predicting the initiation and duration of a service outage in accordance with an alternate embodiment of the present invention. Rectangular coordinates operator display 1600 illustrates sky blockage data represented in rectangular form rather than the circular display shown in FIG. 15. Rectangular coordinates operator display 1600 reports satellite availability, and in turn impending outages or impairments in a plot of points generated by plotting elevation angle data on a first axis 1610 against azimuth angle data on a second axis 1615. Obstructed region 1620 corresponds to obstructed region 1520 in FIG. 15, and clear or unobstructed region 1625 corresponds to clear or unobstructed region 1525 in FIG. 15. Satellites 13 and 14 are again represented along with their corresponding directions of travel as represented by arrows 1530 and 1540 respectively.

Referring back to FIG. 13, after the service status display is generated in step 430, the next time interval can be processed in step 434, and steps 416–434 can be performed iteratively. In this embodiment, service status display 1500 is used by the terminal operator to identify impending service outages or impairments by monitoring the direction of travel and position of the satellites in view with respect to obstructed regions 1520 so that the terminal operator could prepare for impending outages before they occur.

Additionally, steps 435 and 436 also can be added to the iterative process. When steps 435 and 436 are performed, an impending service outage notice is generated in addition to the service status display generated in step 430. In step 435, service outage predictor unit 355 (FIG. 3) examines the service time line outage profile completed in step 429 and determines whether potential communication links with all possible available satellites are blocked at any time during the predetermined time interval. If a determination is made that all satellites will be blocked at any time during the predetermined time interval, an impending service outage notice will be generated and presented to the terminal operator through the operator terminal display 359 (FIG. 3).

Figure 17:
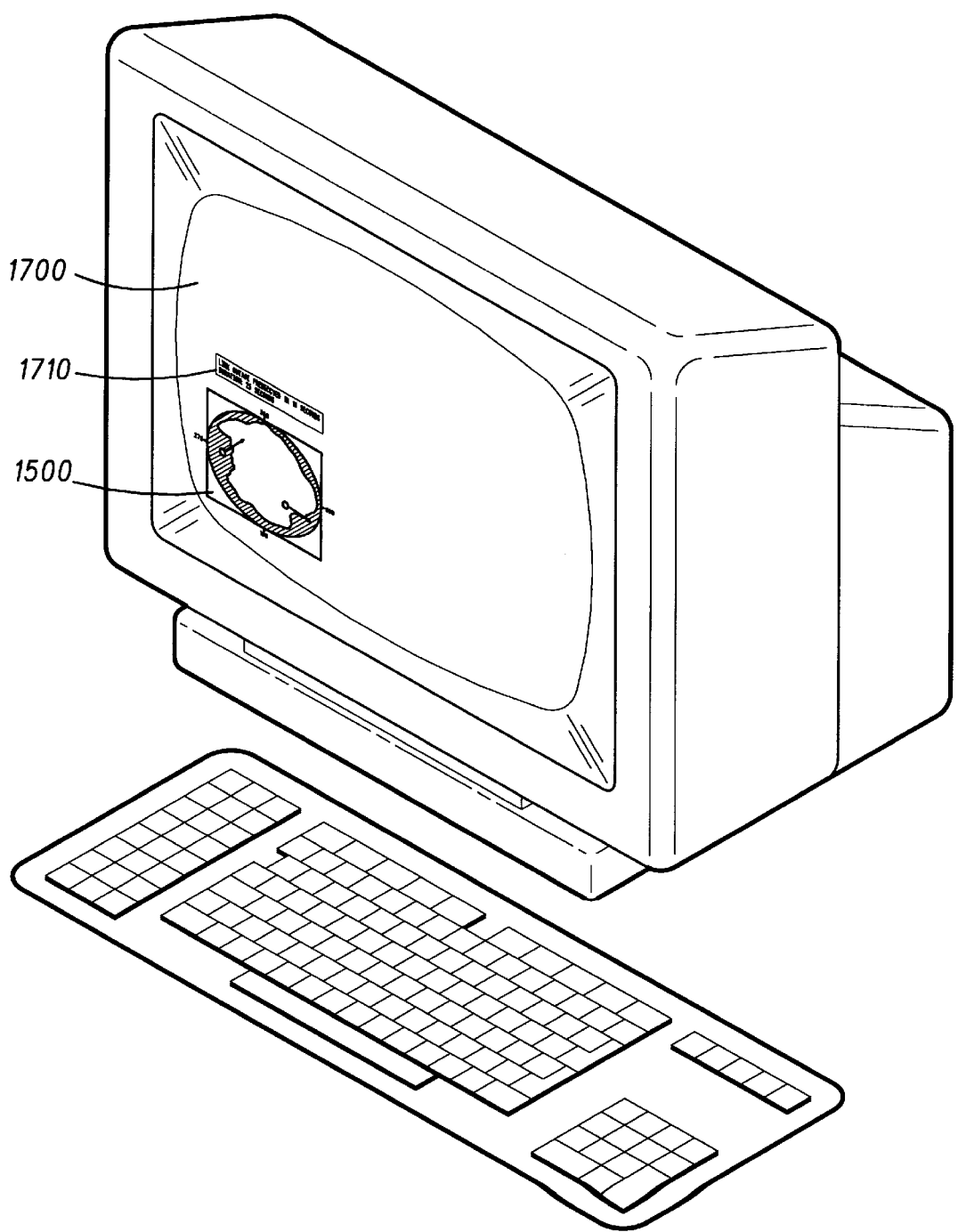
FIG. 17 illustrates a terminal operator display in accordance with a preferred embodiment of the present invention.

FIG. 17 illustrates a terminal operator display for reporting an impending service outage in accordance with a preferred embodiment of the present invention. In FIG. 17, operator terminal display 1700 includes service status display 1500 and impending service outage notice 1710. Impending outage report 1710 desirably includes information indicating the predicted onset and duration of an impending outage report. However, impending outage report 1710 also could include different types of information in addition to or as a substitute for such information (e.g., information concerning the reason for an impending outage or impairment).

Impending service outage notice 1710 desirably is generated as needed to provide the terminal operator with sufficient warning of an impending service outage to allow the operator to take precautions to mitigate the effects of a service outage (e.g., execute operations, save or send data, etc.). For example, during the time interval represented by service status display 1500 in FIG. 15, the system is currently clear or unblocked. However, satellite 14 is traveling in a direction of travel 1540 toward obstructed region 1520 (e.g., satellite 14 is about to travel behind a small tree in the southeast and will become blocked), and satellite 13 already is within an obstructed area (e.g., behind a tree in the west). Thus a service outage is impending. In step 435 of method 1300 (FIG. 13), this impending service outage will be recognized by service outage predictor unit 355 (FIG. 3) and reported to the terminal operator through impending service outage notice 1710 as shown in FIG. 17. The impending outage service notice could appear concurrent with service status display 1500 or could appear alone, without the accompanying service status display.

FIG. 18 is a simplified block diagram of a ground-to-satellite terminal in accordance with a preferred embodiment of the present invention. Terminal 220 includes processor 222, memory storage device 226, and operator display unit 359. Memory storage device 226 is capable of storing a terminal blockage profile as well as a satellite blockage profile and data relating to atmospheric conditions, including weather conditions. As described in conjunction with various embodiments of the invention, the terminal blockage profile could include, for example, a map of the environment experienced by the terminal antenna which could be a map derived from signal measurements (e.g., Fresnel diffracted signal measurements), a field-of-view map, or a backscatter data map. In alternate embodiments, a terminal blockage profile could be stored at a control facility, a satellite, or in other nodes of the communication system, or a combination thereof.

Additionally, memory storage device 226 desirably is adapted to store service outage time line profiles and/or impending outage reports. Such profiles and/or reports can then be accessed by the system operator or other service provider associated with the communication system to verify customer outage claims, to provide objective data concerning service outages, and/or to aid in trouble-shooting and providing maintenance service for operator terminals. In a preferred embodiment, the system operator or service provider can access records concerning outages or impairments remotely from the system operator or service providers location through transceiver 227. In an alternate embodiment, the system operator or service provider can extract such records directly from the terminal at the terminal's location.

Processor 222 is used to respond to the terminal blockage profile, when necessary. Such response could be initiated by processor 222, for example, or could result from the receipt of an instruction directing processor 222 to respond to the terminal blockage profile. Responding to the terminal blockage profile, for example, could involve processor 222 executing an algorithm for initiating one or more hand-offs to one or more satellites. In a preferred embodiment, processor 222 is also for periodically initiating and generating updates of outage time line profiles for the terminal. Additionally, in a preferred embodiment, processor 222 is adapted to execute one or more of the steps described with reference to method 1300 (FIG. 13). Desirably, processor 222 is adapted to carry out the functions described herein with reference to service outage predictor unit 355 (FIG. 3). In alternate embodiments, the functions described with reference to service outage predictor unit can be carried out at a control facility, in a satellite, or in other nodes of the communication system, or a combination thereof. Processor desirably is in communication with operator display unit 359 and/or service outage predictor unit 355, which either can be collocated as part of processor 222 or can be an independent unit as shown in FIG. 3.

In a preferred embodiment, terminal 220 also includes measurement device 224. Measurement device 224 is not necessary in those embodiments where terminal 220 does not gather data for its blockage profile. However, in those embodiments where terminal 220 does gather data for the terminal blockage profile, measurement device 224 could be, for example, a device for detecting Fresnel diffracted signals, an optical fisheye lens camera, or a backscatter signal detection device.

In summary, the present invention provides a method and apparatus which combines the terminal's blockage profile with satellite location and motion data and also optionally with atmospheric information in the form of signal strength and/or weather models to predict impending service outages or impairments on a real-time or near real-time basis and to report such impending outages or impairments and the expected duration thereof to the terminal operator. The service predictor unit could be included temporarily or permanently in a customer's stationary ground-to-satellite terminal or even in a moveable terminal. The inclusion of a service outage predictor unit directly in an operator terminal provides a direct source of information concerning the performance of the terminal at the terminal site.

As an application for the present invention, communication systems using non-geosynchronous satellites may make use of this service predictor unit to allow customers of such systems to have advanced warnings of impending service outages. The system operator or other service provider associated with the communication system can use the service outage information generated by the method and apparatus of the present invention to verify customer outage claims, to provide objective data concerning service outages, and/or to aid in troubleshooting and providing maintenance service for operator terminals. Similarly, service outage information generated by the method and apparatus of the present invention also can be monitored over time to determine if any degradation in service is due to growth of foliage or construction of new buildings in the area of the operator antenna.

The present invention has been described above with reference to a preferred embodiment. However, those skilled in the art will recognize that changes and modifications could be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

What is claimed is:

1. A method for a ground-to-satellite terminal to predict a service outage in a satellite communication system, the method comprising the steps of:
   a) receiving a terminal blockage profile based upon a location of said ground-to-satellite terminal;
   b) receiving a satellite blockage profile of one or more satellites of said satellite communication system;
   c) using said terminal blockage profile and said satellite blockage profile to predict a service outage for said ground-to-satellite terminal;
   d) combining said terminal blockage profile and said satellite blockage profile to generate a service status display report for use in predicting said impending service outage or impairment; and
   e) said service status display report comprises a circular operator display showing one or more satellites located within a field-of-view of said ground-to-satellite terminal within a predetermined time interval and showing one or more obstructed region where a communications link between said ground-to-satellite terminal and said one or more satellites may be blocked or otherwise impaired during said predetermined time interval, and wherein said circular operator display is generated, at least in part, from an optical image corresponding, at least in part, to a field-of-view of said antenna of said ground-to-satellite terminal.

2. The method of claim 1, wherein the step of receiving a terminal blockage profile comprises the step of creating the terminal blockage profile, including the steps of:
   (a1) gathering, by said ground-to-satellite terminal, blockage data at a site of an antenna of said ground-to-satellite terminal; and
   (a2) mapping said blockage data to a blockage profile database.

3. The method of claim 2, wherein step (a1) further includes the step of gathering Fresnel zone signal data from one or more line-of-sight communication link signals.

4. The method of claim 2, wherein step (a1) further includes the step of measuring data describing a field-of-view of the antenna of the terminal wherein the measurements can be taken anywhere along a spectrum.

5. The method of claim 2, wherein step (a1) further includes the step of forming a backscatter representation of a field-of-view of the terminal antenna.

6. The method of claim 1, wherein step (b) comprises the step of creating a satellite blockage profile of one or more satellites including the steps of:
   (b1) monitoring a beacon signal transmitted by the terminal; and
   (b2) storing beacon signal measurements describing a relative strength of the beacon signal into a database.

7. The method as claimed in claim 1, wherein said service status display report comprises a rectangular operator display showing one or more satellites located within a field-of-view of said ground-to-satellite terminal within a predetermined time interval and showing one or more obstructed region where a communications link between said ground-to-satellite terminal and said one or more satellites may be blocked or otherwise impaired during said predetermined time interval, and wherein said rectangular operator display is generated, at least in part, from rectangular coordinates corresponding to said terminal blockage profile.

8. The method of claim 1, wherein step (c) comprises the steps of:
   (c1) determining, for a particular time increment, whether at least one satellite is in clear view of an antenna associated with said ground-to-satellite terminal;
   (c2) recording a result of step (c1);
   (c3) repeating steps (c1)–(c2) over a predetermined time interval; and
   (c4) using recorded results to create a service outage time line profile.

9. The method as claimed in claim 8, further including the step of:
   (c5) storing a record corresponding to said service outage time line profile.

10. The method as claimed in claim 9, further including the step of:
    (c6) using said record corresponding to said service outage time line profile to verify a service outage claim.

11. The method as claimed in claim 9, further including the step of:
    (c6) using said record corresponding to said service outage time line profile to aid in trouble-shooting and providing maintenance service for said ground-to-satellite terminal.

12. The method as claimed in claim 9, further including the step of:
(c6) periodically updating said service outage time line profile.

13. The method as claimed in claim 1, further comprising the step of:
(d) using said terminal blockage profile to generate an impending service outage notice for warning a terminal operator of said impending service outage or impairment.

14. The method of claim 1, further including the steps of:
d) receiving signal strength data; and
e) using said signal strength data to predict a service impairment due to an atmospheric condition.

* * * * *